United States Patent
Blankenship et al.

(10) Patent No.: US 8,104,783 B2
(45) Date of Patent: Jan. 31, 2012

(54) FORK LIFT RECEIVER HITCH

(75) Inventors: Christina Blankenship, Huntsville, AL (US); John Michael Bush, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 395 days.

(21) Appl. No.: 12/564,583

(22) Filed: Sep. 22, 2009

(65) Prior Publication Data

US 2011/0068559 A1    Mar. 24, 2011

(51) Int. Cl.
*B60D 1/07* (2006.01)
*B60D 1/02* (2006.01)
*B60D 1/06* (2006.01)

(52) U.S. Cl. ............. 280/416.1; 280/504; 280/515; 280/511

(58) Field of Classification Search ............. 280/415.1, 280/416.1, 416.3, 477, 478.1, 479.2, 479.3, 280/491.1, 491.2, 495, 498, 499, 504, 511, 280/515
See application file for complete search history.

(56) References Cited

U.S. PATENT DOCUMENTS

| | | | |
|---|---|---|---|
| 3,207,085 A * | 9/1965 | Burr | 105/72.2 |
| 4,008,905 A * | 2/1977 | Soteropulos et al. | 280/506 |
| 5,195,768 A * | 3/1993 | Hendrix | 280/428 |
| 5,547,210 A * | 8/1996 | Dugger | 280/477 |
| 6,135,701 A | 10/2000 | Galloway, Sr. | |
| 6,390,489 B1 | 5/2002 | Friesen | |
| 6,502,845 B1 * | 1/2003 | Van Vleet | 280/491.1 |
| 6,536,794 B2 | 3/2003 | Hancock et al. | |
| 6,874,804 B2 * | 4/2005 | Reese et al. | 280/477 |
| D620,403 S * | 7/2010 | Blankenship et al. | D12/162 |
| 7,784,813 B2 * | 8/2010 | Columbia | 280/511 |
| 2009/0139801 A1 * | 6/2009 | Friesen | 187/237 |

* cited by examiner

*Primary Examiner* — Paul N Dickson
*Assistant Examiner* — Wesley Potter
(74) *Attorney, Agent, or Firm* — Michael K. Gray

(57) ABSTRACT

A fork lift hitch receiver has a trailer attachment side and a fork lift receiving side separated by an insert guard. Top, middle and bottom structural layers on the fork lift receiving side are provided with apertures which form a rod reception path. The fork lift receiving side is inserted into a receiving cavity of the forklift where an attachment rod of the forklift is inserted through the rod reception path. The insert guard covers the receiving cavity and assists in orienting the fork lift receiving side to a location within the cavity where the attachment rod can be inserted through the reception path. A guide path formed in the top layer on the receiving side of the fork lift hitch receiver further aids in guiding the attachment rod to the reception path. A ball and a ball support member are attached to the trailer attachment side.

11 Claims, 4 Drawing Sheets

FORK LIFT RECEIVER HITCH

The invention described herein may be manufactured, used and licensed by or for U.S. Government for governmental purposes without payment of any royalties thereon.

BACKGROUND OF THE INVENTION

I. Field of the Invention

The present invention pertains to the field of trailer hitches. More particularly the present invention pertains to a mechanism for securely attaching a trailer to a fork lift.

II. Discussion of the Background

In certain environments, such as those having confined and hazardous working areas, in order to haul materials on a trailer, a highly maneuverable towing vehicle is required. Forklifts having a near zero degree of towing radius provide a great degree of maneuverability for such environments. However, an attachment means for easily and securely attaching a trailer to a forklift, so as to provide functionality and ease of maneuverability for both vehicles, has not been available.

SUMMARY OF THE INVENTION

Accordingly, one object of the present invention is to provide a fork lift receiver hitch which can be safely and easily secured to a forklift and trailer by a single individual.

Yet another object of the present invention is to provide a fork lift receiver hitch which will allow maximal maneuverability of the trailer towed by the forklift.

These and other valuable objects are realized by a fork lift receiver hitch for attachment to an insert cavity of a fork lift, the insert cavity of the forklift being provided with an attachment rod or pin. The fork lift hitch receiver has a base, with the base having a bottom wall, a top wall and a first sidewall and a second sidewall. The bottom wall, the top wall and the first and second sidewalls of the base form a hollow structure with the base extending for a predetermined length.

The fork lift hitch receiver is further provided with a cover. The cover has a top, a first side and a second side, with the first side of the cover being connected to the first sidewall of the base and the second side of the cover being connected to the second sidewall of the base. The cover extends for a portion of the predetermined length of the base, with the portion extending from a front edge of the cover to a back edge of the cover. A deck extends from the front edge of the cover to a front edge of the deck, with the deck being a part of the top wall of the base. An insert guard is mounted on the cover. The insert guard separates a fork lift receiving side from a trailer attachment side of the fork lift hitch receiver.

A support member is mounted on the front deck region and a ball support member connects to the support member. The top of the cover is provided with a first aperture, the top wall of the base is provided with a second aperture and the bottom wall of the base is provided with a third aperture. The first, second and third apertures are in linear alignment so as to form a rod reception path for the attachment rod of the fork lift. A guide channel is formed in the top cover with the guide channel being aligned with the first aperture. The fork lift hitch receiver is further provided with safety chain links laterally attached to the front deck.

BRIEF DESCRIPTION OF THE DRAWINGS

A more complete appreciation of the invention and many of its attendant advantages will be readily obtained as the same becomes better understood by reference to the following detailed description when considered in connection with the accompanying drawings which are identified below.

DETAILED DESCRIPTION

Figure 1:
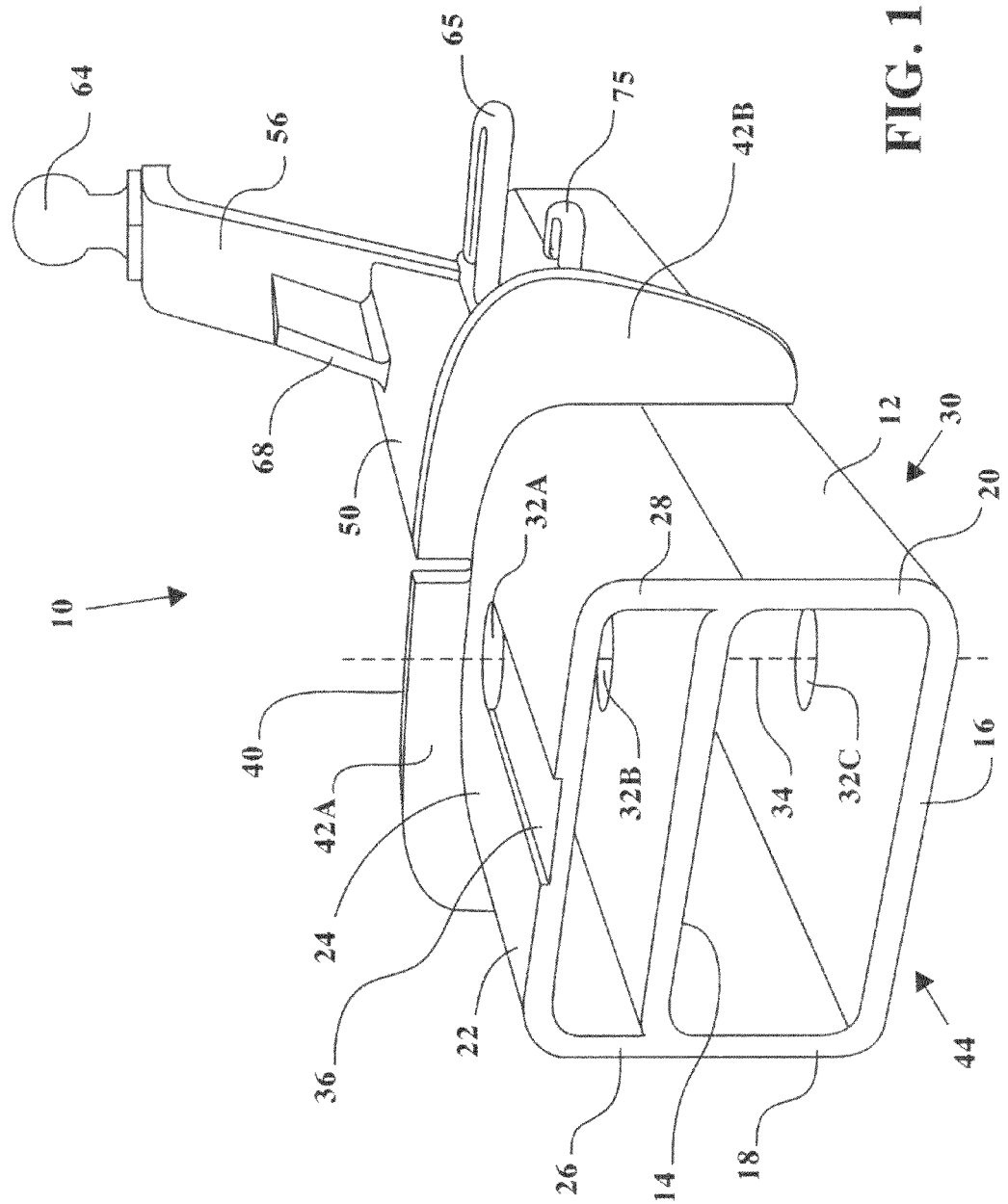
FIG. 1 is a rear end perspective view of the fork lift receiver hitch of the present invention.

With reference to FIG. 1, the fork lift hitch receiver 10 of the present invention has a base 12. Base 12 in the prototype of the present invention is a steel, rectangular tubular member having a top wall 14, a bottom wall 16, and respective sidewalls 18 and 20. Mounted above the base 12 is a cover 22 having a top 24 and respective sides 26 and 28. The cover 22 is tapered or bowed at its lateral edges where the top 24 bends to form sides 26 and 28. In the prototype of the present invention, cover 22 was made of steel and was welded to base 12 to form a fork lift receiving end 30. (The invention is not limited to a steel construction, but can be made of other materials having suitable strength and durability.)

The top 24 of cover 22 has a round hole or aperture 32A. The top wall 14 of base 12 has an aperture 32B and the bottom wall 16 of base 12 has an aperture 32C. Apertures 32A, 32B and 32C are linearly aligned to form a rod reception path 34. The middle region of top 24 is machined to form a well or guide channel 36 leading to aperture 32A. The guide channel 36 extends from the back edge of top section 24 to an insert guard 40. The guide channel 36 is graded such that it is deepest proximate to the edges of the aperture 32A.

Figure 5:
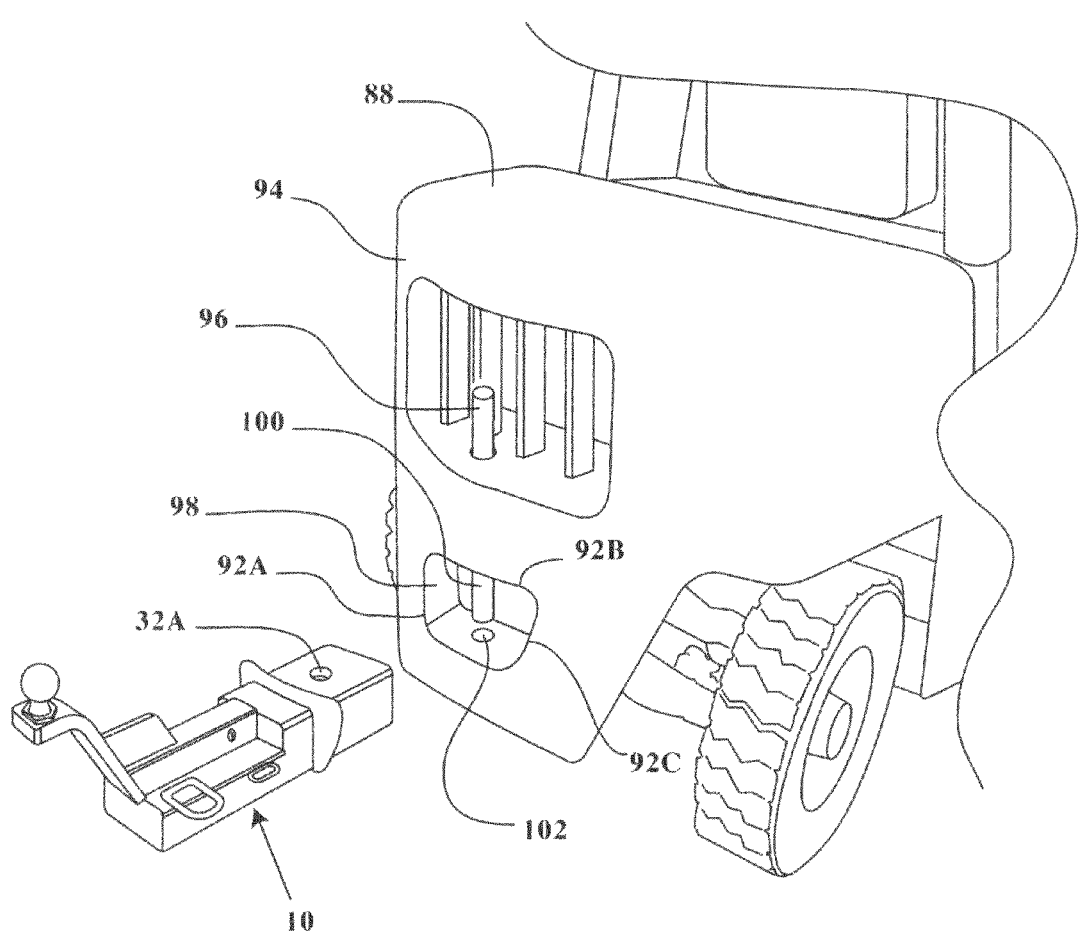
FIG. 5 is an explanatory explosive view of the fork lift receiver hitch as it is inserted into the connector or insert cavity of a forklift.

Insert guard 40 extends across the top 24 of cover 22, and, in conjunction with the guide channel 36, serves as an aid in the placement of a rod member into the rod reception path 34. Further, when installing the fork lift hitch receiver 10 if an individual keeps his or her hands and fingers on the trailer connection side 55 of the fork lift hitch receiver 10, the insert guard 40 protects hands and fingers from being pinched during installation while providing an aesthetic outer cover to the connector cavity 98 of the forklift (FIG. 5). Insert guard 40 may be viewed as a line of demarcation between the trailer connection side 55 and the forklift receiving side 30 of the fork lift hitch receiver 10.

In the prototype of the present invention, the insert guard 40 was formed by two wings 42A, 42B. Both of the wings 42A, 42B extend perpendicularly outward from top 24. Wing 42A is welded to top 24 and to sidewall 18. Wing 42B is welded to top 24 and to sidewall 20. In the prototype of the present invention wings 42A, 42B were cut from sheet metal and had a concave orientation when viewed from the rear 44 of the fork lift hitch receiver 10. When the receiving end 30 of the fork lift hitch receiver 10 is inserted into the connector cavity 98 of a forklift, the insert guard 40 prevents further insertion of the fork lift hitch receiver into the connector cavity 98 and covers the outer top edge 92B and side edges 92A, 92C of the connector cavity 98 from view (FIG. 5).

Figure 2:
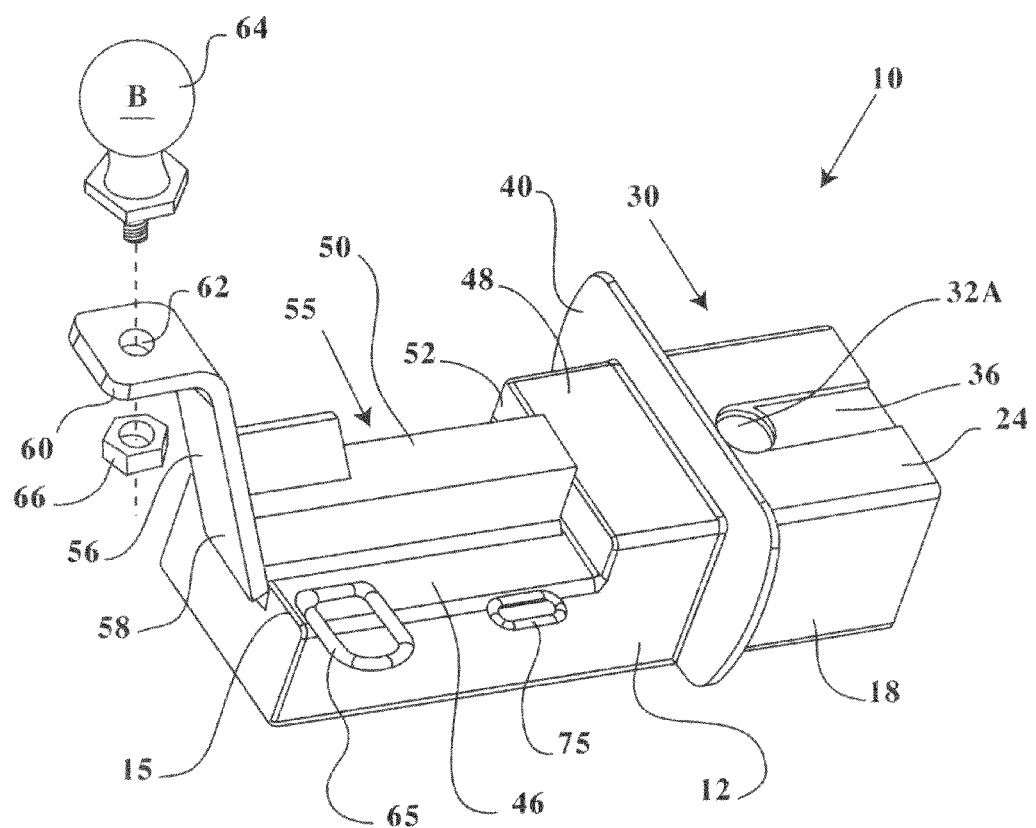
FIG. 2 is a front end isometric perspective view of the fork lift receiver hitch of the present invention.

With reference to FIG. 1 and FIG. 2, the top wall 14 extends the length of base 12 to form a front deck 46 which is positioned forward of the front portion 48 of top 24. A rectangular support 50 made of steel is welded to the front deck 46 and substantially extends the length of front deck 46 from an edge 52 of front portion 48 to the front edge 15 of deck 46. A ball support 56 made of one-piece steel construction has a sloped region 58 and a planar region 60. The planar region 60 is provided with a hole 62 for accommodating a ball 64 which is secured to the planar region 60 by nut or wing-nut 66. For added support and strength a steel reinforcement plate 68 is welded to the rectangular support 50 and ball support member 56. The safety chain links 65, 75 which are laterally attached to the front deck 46 are used to attach chains from a trailer to the fork lift hitch receiver. In the event that the trailer ball 64 and trailer were to become uncoupled, the chains would prevent the trailer from becoming completed separated from the fork lift.

Figure 3:
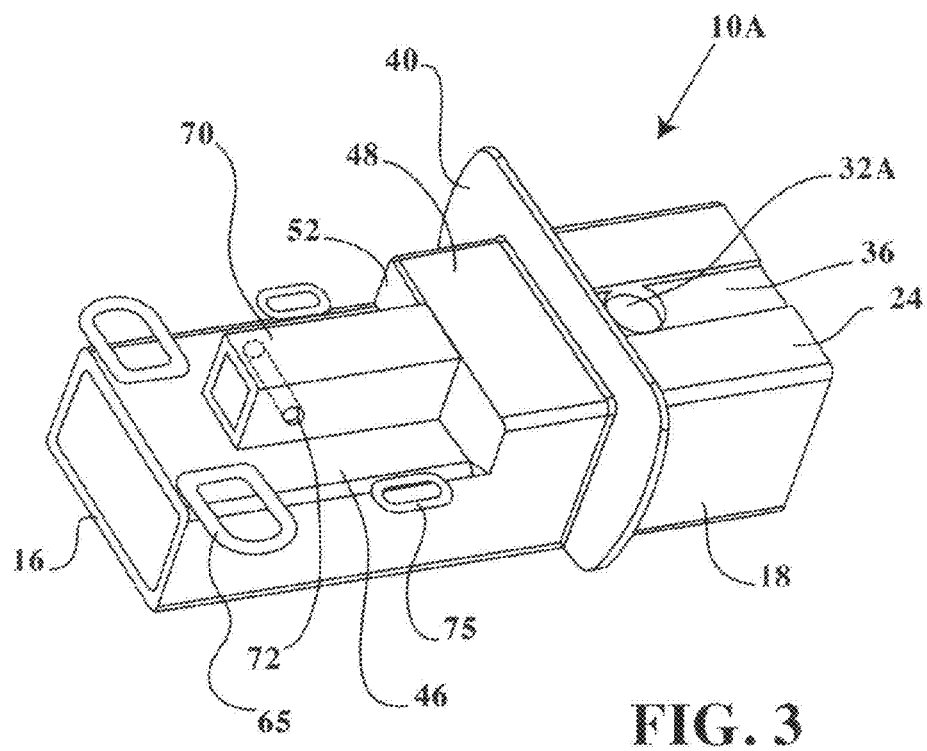
FIG. 3 is a front end isometric perspective view of the fork lift receiver hitch in an alternative embodiment of the present invention.

With reference to FIG. 3, an alternative embodiment of present invention is a fork lift hitch receiver 10A which is provided with an abbreviated support 70 made of steel and welded to the front deck 46, but which extends for only a portion of the length of front deck 46. Support 70 is provided with linearly aligned attachment holes 72 on each of its lateral sides to allow a secure attachment of a ball attachment extension member 74. (FIG. 4)

Figure 4:
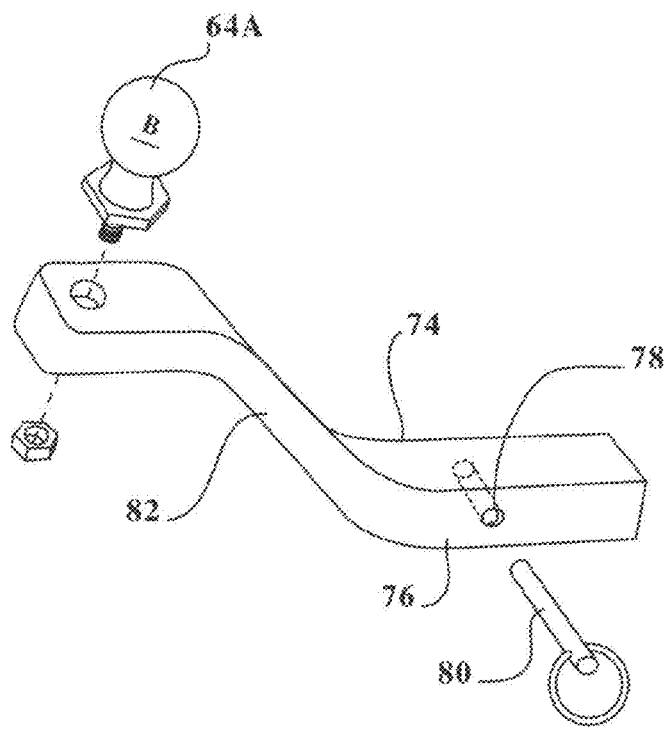
FIG. 4 is a perspective illustration of an extension member utilized in the embodiment of FIG. 3.

With reference to FIG. 4, the ball support attachment extension member 74 has a three-sided steel formed attachment section 76 provided with attachment holes 78 linearly aligned on its lateral sides. To connect the extension member 74 to support 70 (FIG. 3), the attachment section 76 slides over support 70 to a location where the holes 78 of the extension member 74 are aligned with the holes 72 of support 70. Support 70 and extension member 74 are then locked together by a locking pin 80.

The attachment section 76 of extension member 74 connects to a neck region 82 which accommodates a ball 64A. The attachment section 74 and neck region 82 can be various lengths for purposes of attaching to trailers of various heights, etc. Thus, the fork lift hitch receiver 10A can accommodate trailers of various heights and ball size requirements.

With reference to FIG. 5, a conventional fork lift 88 is provided with a cast iron counterweight section 94 located at the rear of the vehicle (the front of the forklift and forks are not shown). An iron rod or pin 96 within the cast iron counterweight section 94 slides up and down therein. The rod 96 is accessible by an insert cavity 98 formed in the counterweight section 94. The bottom end 100 of the rod 96 is secured by a recess hole 102 in recess cavity 98.

To attach the present invention, an individual would lift rod 96 of the fork lift's counterweight section 98 and lift the fork lift hitch receiver 10, 10A such that the fork lift receiving end 30 thereof and aperture 32A are linearly aligned with the raised rod 96. The fork lift hitch receiver would then be slid under the bottom end 100 of rod 96 to a position where rod 96 is inserted through the aperture 32A with the rod extending through the rod reception path 34 until the bottom end 100 of the rod 96 is secured in the recess hole 102 of the counterweight section 94.

The length of the fork lift hitch receiver of the present invention is predicated on the distance required to prevent a trailer from hitting the fork lift's rear during a small radius turn. The distance allows for full visibility of the receiving ball 64 so that the fork lift operator can line up the fork lift receiver hitch to a trailer without assistance from another individual. Thus time and labor are reduced when compared with the typical trailer hitch connection technique.

In the prototype of the present invention, the length of the base 12 was 20⅜ inches with the width of the base 12 being 6 inches. The cover 22 had a length of 10½ inches and the deck 46 had a length of 10⅜ inches. The length of the ball support 56 was 11½ inches at an angle of 60 degrees. The dimensions of the fork lift hitch receiver 10, consistent with the teachings of the present invention, can be fabricated to accommodate a given insert cavity 98 of a particular forklift of the type demonstrated in FIG. 5. As previously related, the ball support 56 can be of various angles and lengths to accommodate various trailer heights.

Various modifications are possible without deviating from the teachings and spirit of the present invention. Accordingly the scope of the invention is limited only by the claim language which follows hereafter.

What is claimed is:

1. A fork lift hitch receiver for attachment to an insert cavity of a fork lift, the insert cavity of the forklift having an attachment rod, said fork lift hitch receiver comprising:
    a base, said base having a bottom wall, a top wall and a first sidewall and a second sidewall, said bottom wall, said top wall and said first and second sidewalls forming a hollow structure, said base extending for a predetermined length;
    a cover, said cover having a top, a first side and a second side, said first side of said cover being connected to said first sidewall of said base and said second side of said cover being connected to said second sidewall of said base, said cover extending for a portion of the predetermined length of said base, said portion extending from a front edge of said cover to a back edge of said cover;
    a front deck region extending from the front edge of said cover to a front edge of said deck, said deck being a part of the top wall of said base;
    an insert guard mounted on said cover;
    a rectangular support member mounted on said front deck region;
    a ball support member connected to said rectangular support member; and
    wherein said top of said cover is provided with a first aperture, said top wall of said base is provided with a second aperture and the bottom wall of said base is provided with a third aperture, said first, second and third apertures being in linear alignment so as to form a rod reception path for the attachment rod of the fork lift.

2. A fork lift hitch receiver according to claim 1, further comprising: a reinforcement plate directly connected to said rectangular support member and to said ball support member.

3. A fork lift hitch receiver according to claim 1, wherein: said rod reception path is on a forklift receiving side of said fork lift hitch receiver.

4. A fork lift hitch receiver according to claim 3, wherein: said rectangular support member is located on a trailer attachment side of said fork lift hitch receiver.

5. A fork lift hitch receiver according to claim 4, wherein: said insert guard separates said fork lift receiving side from said trailer attachment side of said fork lift hitch receiver.

6. A fork lift hitch receiver according to claim 5, further comprising: at least one safety chain link connected to said base on the trailer attachment side of said fork lift hitch receiver.

7. A fork lift hitch receiver according to claim 6, wherein: said base is welded to said cover.

8. A fork lift hitch receiver according to claim 6, further comprising: a ball attachable to said ball support member.

9. A fork lift hitch receiver according to claim 1, wherein: said insert guard has a first wing directly connecting to said top of said cover and to said first side of said cover, and said insert guard has a second wing directly connecting to said second side of said cover and to said top of said cover.

10. A fork lift hitch receiver according to claim 1, further comprising: a guide channel formed in said top cover, said guide channel being aligned with said first aperture.

11. A fork lift hitch receiver according to claim 1, wherein: said ball support member is detachably connected to said rectangular support member and secured to said rectangular support member by a locking pin.

* * * * *